(12) United States Patent
Lee

(10) Patent No.: US 9,841,513 B2
(45) Date of Patent: Dec. 12, 2017

(54) X-RAY DETECTOR

(71) Applicant: VIEWORKS CO., LTD., Gyeonggi-do (KR)

(72) Inventor: Bo Ram Lee, Seoul (KR)

(73) Assignee: VIEWORKS CO., LTD., Anyang-si, Gyeonggi-Do (KR)

( * ) Notice: Subject to any disclaimer, the term of this patent is extended or adjusted under 35 U.S.C. 154(b) by 0 days.

(21) Appl. No.: 15/189,422

(22) Filed: Jun. 22, 2016

(65) Prior Publication Data

US 2016/0377743 A1    Dec. 29, 2016

(30) Foreign Application Priority Data

Jun. 25, 2015   (KR) .................. 10-2015-0090353

(51) Int. Cl.
*G01T 1/24* (2006.01)
*G01T 1/17* (2006.01)

(52) U.S. Cl.
CPC . *G01T 1/24* (2013.01); *G01T 1/17* (2013.01)

(58) Field of Classification Search
CPC .................................... G01T 1/24; G01T 1/17
USPC ............ 250/370.06, 370.01, 370.09, 363.01
See application file for complete search history.

(56) References Cited

U.S. PATENT DOCUMENTS

2013/0228697 A1*   9/2013  Soh .................. H04N 5/32
                                                      250/394

FOREIGN PATENT DOCUMENTS

| KR | 10-2010-0047167 A | 5/2010 |
| KR | 10-2014-0087247 A | 7/2014 |
| KR |    1020140132098 A | 11/2014 |

OTHER PUBLICATIONS

Office Action dated Aug. 29, 2016 in Korean Application No. 1020150090353.

* cited by examiner

*Primary Examiner* — David Porta
*Assistant Examiner* — Meenakshi Sahu
(74) *Attorney, Agent, or Firm* — Saliwanchik, Lloyd & Eisenschenk

(57) ABSTRACT

The present disclosure relates to an X-ray detector which includes a pixel unit configured to include a photodiode and to output a voltage corresponding to an incident amount of X-rays, a comparator configured to compare the output voltage of the pixel unit with a preset threshold voltage to output a logic signal, and a counter configured to count the output signal of the comparator to convert to a digital output.

3 Claims, 4 Drawing Sheets

X-RAY DETECTOR

CROSS-REFERENCE TO RELATED APPLICATION

This application claims priority under 35 U.S.C. §119 to Korean Patent Application No. 10-2015-0090353, filed Jun. 25, 2015, which is hereby incorporated by reference in its entirety.

BACKGROUND

1. Field of the Invention

The present disclosure relates to an X-ray detector, and more particularly, to an X-ray detector for an X-ray signal to output the X-ray signal as a digital signal.

2. Discussion of Related Art

An X-ray detector is a device for detecting an X-ray signal to convert the detected X-ray signal into an electrical signal, and generally converts an X-ray signal into an electrical signal using a photodiode.

In other words, a scintillator or a phosphor being located in front of a photodiode may absorb X-rays to radiate visible light corresponding to the absorbed X-rays, the photodiode may convert the visible light into a photocurrent in proportion to an amount of the visible light, and the converted photocurrent may be measured to detect the X-rays.

Such a photodiode generally detects light using a PN junction of a semiconductor. That is, the photodiode detects light using a phenomenon in which electrons and holes of a positive charge are generated when light is incident to cause a current to flow.

As a photodiode, a PIN diode, an avalanche photodiode (APD) and the like are mainly used. A PIN photodiode has a structure in which an intrinsic semiconductor layer having a large resistance due to a small carrier is disposed in the middle of a PN junction.

On the other hand, an APD photodiode has an avalanche layer in the middle of a PN junction and a carrier generated according to excitation of incident light collides with an atom in the avalanche layer by a high electric field to newly generate a hole-electron pair.

And, the APD photodiode uses the principle that an avalanche effect is generated in the collision process of such hole-electron pairs to increase a photocurrent.

Meanwhile, the background art of the present disclosure is disclosed in Korean Laid-Open Patent Application No. 10-2014-0087247 (Jul. 9, 2014).

SUMMARY OF THE INVENTION

Generally, a typical X-ray detector converts an X-ray signal into a voltage signal using a photodiode, amplifies and readouts the converted voltage signal through a readout circuit (ROIC) including an amplifier and the like, and converts the readout signal into a digital signal using an analog-to-digital converter (ADC), thereby detecting the X-ray signal.

In other words, the typical X-ray detector determines a level of each pixel through a voltage variation of the photodiode induced by X-rays, and in such a case, there is a problem in that a minute discrimination of a pixel level may be difficult due to noise. Also, even though noise at the pixel is reduced, there may be a problem in that the typical X-ray detector is vulnerable to noise generated at post-processing circuits including an ROTC, an ADC, or the like. In addition, power consumed at various post-processing circuits is considerable so that there is a problem in that power consumption of an entire system is increased.

To address the problems described above, an object of the present disclosure is to provide an X-ray detector being effective against noise and provided with post-processing circuits capable of reducing power consumption, compared with a conventional signal processing method.

An X-ray detector according to the present disclosure includes a pixel unit configured to include a photodiode and to output a voltage corresponding to an incident amount of X-rays, a comparator configured to compare the output voltage of the pixel unit with a preset threshold voltage to output a logic signal, and a counter configured to count the output signal of the comparator to convert to a digital output.

The pixel unit may output the voltage of a form which is reduced with a gradient in proportion to the incident amount of X-rays.

The comparator may output a logical high signal when the output voltage is less than the threshold voltage.

The counter may output information regarding a duration time of the logical high signal.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
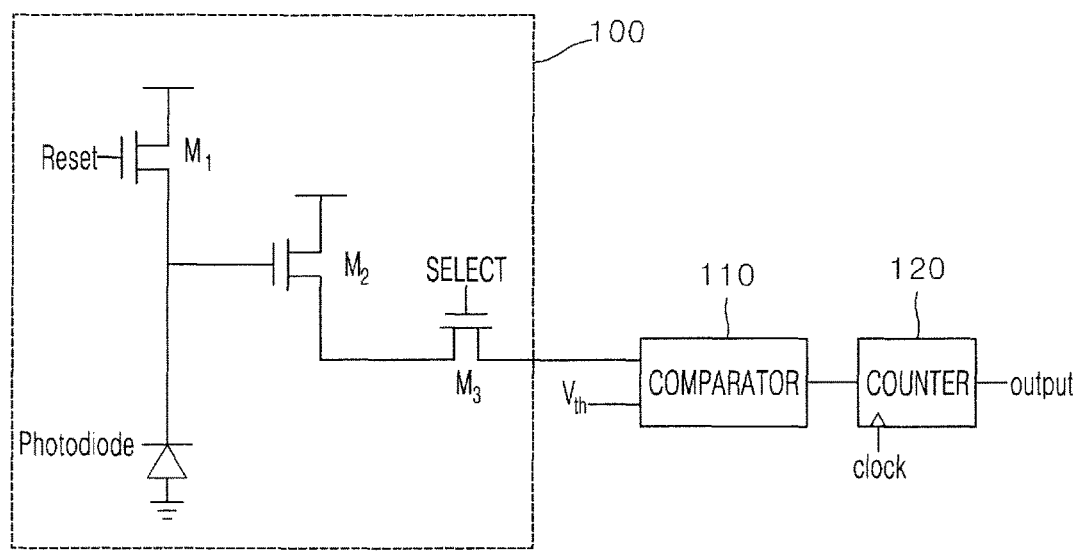
FIG. 1 is an exemplary diagram illustrating a configuration of an X-ray detector according to one embodiment of the present disclosure.

Hereinafter, one embodiment of an X-ray detector according to the present disclosure will be described with reference to the accompanying drawings. By describing the present disclosure, a thickness of a line, a size of a component and the like, which are shown in the drawings, will be somewhat exaggerated to help clearness of a description and understanding thereof. And, all terms used hereinafter are selected by considering functions in embodiments, and meanings thereof may be different according to a user, the intent of an operator, or custom. Therefore, the meanings of the terms used herein should follow contexts disclosed herein.

Figure 2:
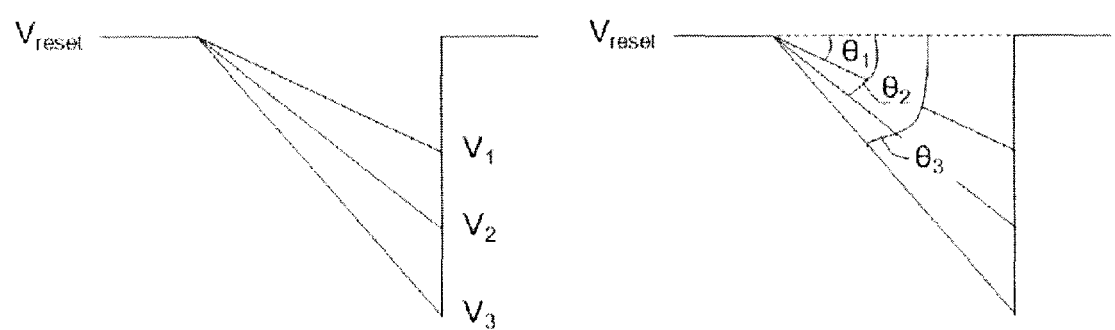
FIG. 2 is an exemplary diagram for describing a voltage output from a pixel unit of the X-ray detector according to one embodiment of the present disclosure.
Figure 3:
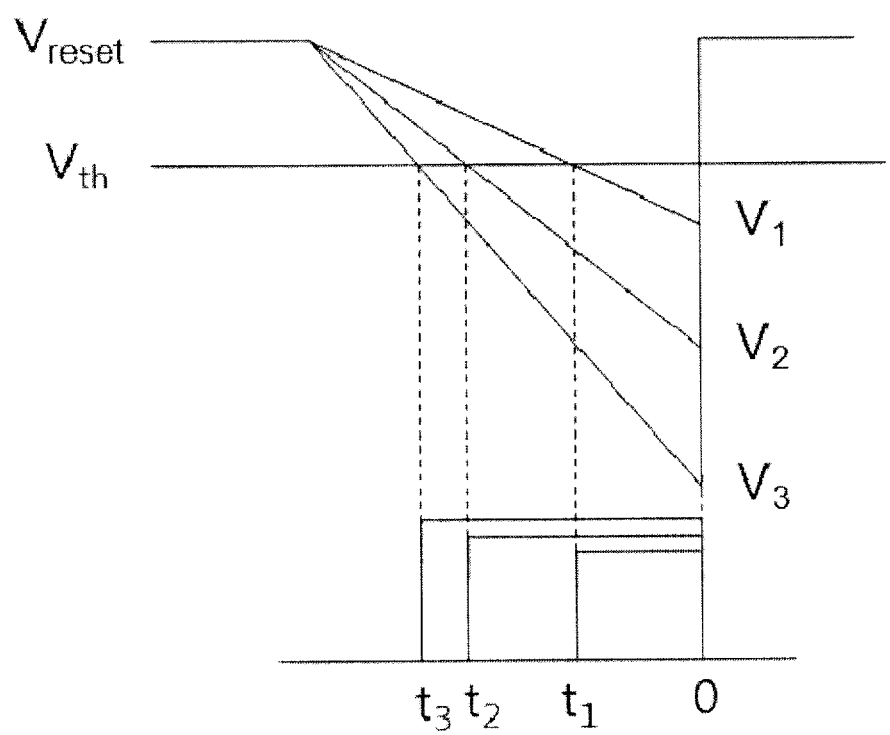
FIG. 3 is an exemplary diagram for describing an X-ray detection method of the X-ray detector according to one embodiment of the present disclosure.
Figure 4:
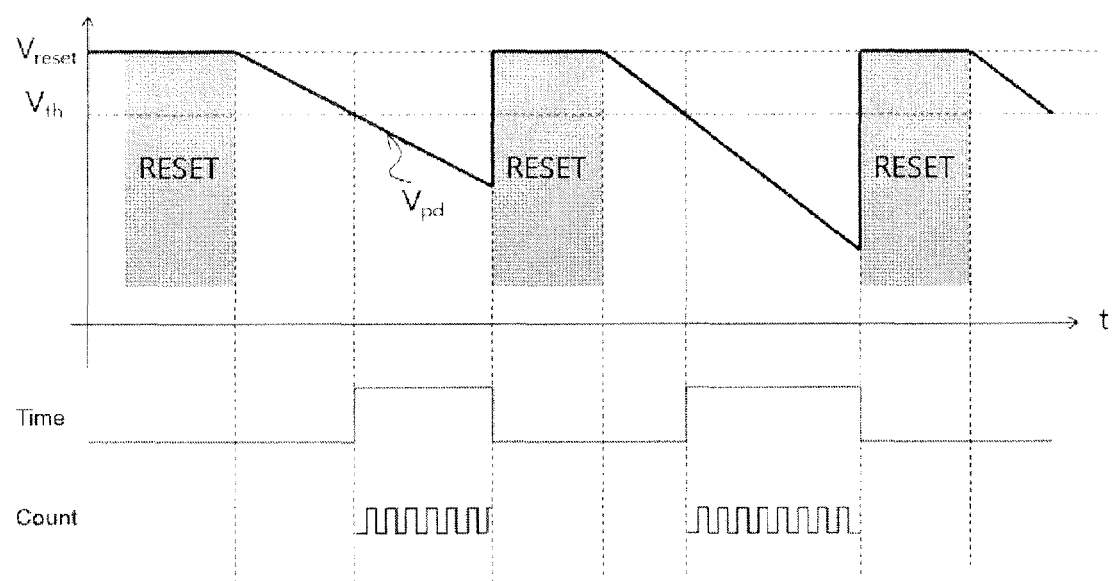
FIG. 4 is an exemplary diagram for describing an operation method of the X-ray detector according to one embodiment of the present disclosure.

FIG. 1 is an exemplary diagram illustrating a configuration of an X-ray detector according to one embodiment of the present disclosure, FIG. 2 is an exemplary diagram for describing a voltage output from a pixel unit of the X-ray detector according to one embodiment of the present disclosure, FIG. 3 is an exemplary diagram for describing an X-ray detection method of the X-ray detector according to one embodiment of the present disclosure, FIG. 4 is an exemplary diagram for describing an operation method of the X-ray detector according to one embodiment of the present disclosure, and, with reference to these drawings, an X-ray detector according to the present embodiment will be described as follows.

As shown in FIG. 1, an X-ray detector according to one embodiment of the present disclosure includes a pixel unit 100, a comparator 110 and a counter 120.

The pixel unit 100 may include a photodiode to output a voltage corresponding to a radiation dose of X-rays.

In particular, when $M_1$ is in an ON state, that is, an X-ray detector is in a reset state, a voltage of a photodiode is sustained at $V_{reset}$. In other words, since a capacitance of a photodiode itself exists, it may be regarded that a capacitor is connected to the photodiode in parallel and charges are accumulated in such a capacitor.

Thereafter, when the X-ray detector is in an integration state, that is, $M_1$ is turned off, charges of $\Delta Q$ in proportion to an amount of incident X-rays discharge the capacitor. Therefore, a voltage level of the photodiode is dropped as much as $\Delta V$ in proportion to $\Delta Q$.

Finally, when the X-ray detector is in a readout state, that is, $M_3$ is turned on, a voltage of the photodiode is reflected to a source terminal of a source follower $M_2$ and is output through $M_3$.

That is, the photodiode in the pixel is sustained at the reset level (reference voltage) and then a voltage level of the photodiode is varied when X-rays passing through an observing object are received. The voltage of the photodiode, which is varied in proportion to an amount of such X-rays, means an image pixel level, and the X-ray detector may output an image through a method by repeating the operation described above after resetting the pixel. In other words, a typical X-ray detector readouts a voltage level of the photodiode, which is dropped as much as in proportion to the amount of incident X-rays, to determine a level of the X-ray.

On the other hand, in the present embodiment, an amount of incident X-rays is determined using a speed of a voltage dropping (gradient). In other words, as can be seen from FIG. 2, an output voltage of the pixel unit 100 after the reset operation is completed is dropped at a speed (gradient) in proportion to an incident amount of X-rays. Therefore, if such a speed (gradient) can be found out, an incident amount of X-rays may be reversely calculated.

In the present embodiment, a time-based processing is used so as to find out such a speed (gradient). In other words, as can be seen from FIG. 3, if a time when an output voltage of the pixel unit 100 is less than a threshold voltage is measured, a gradient of which an output voltage of the pixel unit 100 is decreased may be found out and thus an incident amount of X-rays may be calculated.

That is, the comparator 110 may compare the output voltage of the pixel unit 100 with a preset threshold voltage to output a logic signal. For example, the comparator 110 may output a logic 1, that is, a logical high signal when the output voltage of the pixel unit 100 is less than the threshold voltage, and otherwise, it may output a low signal. In other words, the comparator 110 may perform an analog-to-time conversion.

The counter 120 may count an output signal of such a comparator 110 to convert the output signal into a digital output. That is, the counter 120 may count and output a duration time of a logical high signal, and this may be regarded as performing a time-to-digital conversion.

In other words, as can be seen from FIG. 4, at every operation cycle of each of the X-ray detectors, a voltage of the photodiode is converted into time information by the comparator 110 and then is again converted into digital information by the counter 120. Therefore, the X-ray detector according to the present embodiment may convert an incident amount of X-rays into a digital signal without using a readout circuit (ROIC) including an amplifier, or an analog-to-digital converter (ADC) or the like.

That is, when an ADC is used for an analog-to-digital conversion, circuits are linearly or exponentially increased according to the bit numbers to be converted and consequently power consumption is increased. Therefore, a usage of the ADC may restrict an improvement of a resolution of the X-ray detector. However, if the counter 120 is used as in the present embodiment, a resolution (convertible digital bit numbers) of the ADC may be improved by only increasing a clock of the counter 120 so that such a problem may be solved.

In addition, since a reduction of a size of a transistor causes a low voltage headroom and a low intrinsic gain, a design of an analog circuit is difficult, thus a reduction of a channel length L in a complementary metal oxide semiconductor (CMOS) technology negatively affects the analog circuit. However, the reduction of a size of a transistor has an advantage in that a speed of the transistor may be improved and a power consumption of a digital circuit may be reduced. That is, like the X-ray detector according to the present embodiment, when analog information is processed through a time-based signal processing, a negative effect resulting from the reduction of a size of a transistor may be minimized so that a high processing speed and a low power consumption may be attained.

Meanwhile, after such a process, the X-ray detector may find out an incident amount of X-rays incident into the pixel, that is, an image pixel level using the digital signal (information regarding a duration time of a logical high signal output from the comparator 110) output through the counter 120.

In addition, as shown in FIG. 4, if a resetting is performed and an image acquisition is repeated at every frame rate, an X-ray image in the form of a moving image may be obtained so that the X-ray detector according to the present embodiment may be utilized as an X-ray detector capable of obtaining a moving image.

As described above, the X-ray detector according to the embodiment of the present disclosure may convert and output an X-ray signal into a digital signal through a time-based processing method using the comparator and the counter without using an amplifier or an ADC and thus may reduce an effect due to noise. Also, the X-ray detector according to the embodiment of the present disclosure may have a post-processing circuit of a simplified structure to reduce power consumption of an entire system.

Although the present disclosure has been described in conjunction with embodiments shown in the drawings, these embodiments are illustrative, and it should be understood that numerous other modifications and equivalent other embodiments can be devised by those skilled in the art from this disclosure. Therefore, the scope of the present invention should be defined by the appended claims.

What is claimed is:
1. An X-ray detector comprising:
    a pixel unit configured to include a photodiode and to output a voltage corresponding to an incident amount of X-rays;
    a comparator configured to compare the output voltage of the pixel unit with a preset threshold voltage to output a logic signal; and
    a counter configured to count the output signal of the comparator to convert to a digital output;

wherein the pixel unit outputs the voltage of a form that is reduced with a gradient in proportion to the incident amount of X-rays.

2. The X-ray detector of claim 1, wherein the comparator outputs a logical high signal when the output voltage is less than the threshold voltage.

3. The X-ray detector of claim 2, wherein the counter outputs information regarding a duration time of the logical high signal.

* * * * *